United States Patent [19]

Stutzman

[11] Patent Number: 4,921,374

[45] Date of Patent: May 1, 1990

[54] METHOD FOR REPAIRING UNDERGROUND SEWER LINES

[76] Inventor: Henry G. Stutzman, 8397 Euclid Ave., Manassas Park, Va. 22111

[21] Appl. No.: 415,455

[22] Filed: Sep. 29, 1989

Related U.S. Application Data

[63] Continuation of Ser. No. 233,067, Aug. 17, 1988, abandoned.

[51] Int. Cl.⁵ ............................................. F16L 55/175
[52] U.S. Cl. ................................. 405/154; 405/157; 405/267; 138/99; 175/67; 73/40.7
[58] Field of Search ............... 405/154, 157, 267, 266, 405/248, 264; 138/99, 97; 175/67; 166/253, 250, 292; 73/40.7, 40.5 R

[56] References Cited

U.S. PATENT DOCUMENTS

| | | | |
|---|---|---|---|
| 2,917,085 | 12/1959 | Douse | 138/97 |
| 3,168,908 | 2/1965 | Zurbrigen et al. | 138/97 |
| 3,916,634 | 11/1975 | Woodruff | 405/248 |
| 3,986,365 | 10/1976 | Hughes | 405/264 |
| 4,068,488 | 1/1978 | Ball | 405/154 X |
| 4,084,648 | 4/1978 | Yahiro et al. | 405/267 X |
| 4,391,329 | 7/1983 | Gallus | 166/253 X |
| 4,463,808 | 8/1984 | Mason et al. | 166/292 |
| 4,546,649 | 10/1985 | Kantor | 73/726 X |
| 4,580,442 | 4/1986 | Jones | 73/40.7 |

Primary Examiner—Dennis L. Taylor
Assistant Examiner—J. Russell McBee
Attorney, Agent, or Firm—Harold H. Dutton, Jr.

[57] ABSTRACT

A process for repairing underground sewer lines by preventing the infiltration of groundwater into a leaking sewer line comprising determining the location of the leakage into the sewer line, vacuum excavating a bore into the ground to the sewer line in the vicinity of the leak, depositing a quantity of a water swellable material such as an argillaceous material selected from the group consisting of bentonite and attapulgite into the bore to a depth of at least about one foot above the sewer line, tamping the argillaceous material in the bore, depositing a quantity of gravel over the argillaceous material in the bore, and backfilling the excavation. The water-swellable material also contains a dye which will infiltrate into the sewer line until the leak is sealed. Through a downstream inspection, the presence or absence of the dye indicates whether water infiltration into the sewer line has stopped.

13 Claims, 1 Drawing Sheet

METHOD FOR REPAIRING UNDERGROUND SEWER LINES

CROSS REFERENCE TO RELATED APPLICATION

This application is a continuation of application Ser. No. 233,067 filed Aug. 17, 1988, now abandoned.

This invention relates to an improved method for the repair of underground utility lines, primarily sewer lines. More particularly, the present invention relates to a low cost, highly effective method for stopping infiltration of ground water into sewer lines in municipal or private installations.

BACKGROUND AND OBJECTS

Wastewater treatment systems rely upon a network of underground pipes, e.g. sewer lines, for delivering waste water to the treatment plants, either through gravity flow, or a combination of gravity flow and pumping stations. Typically, such systems consist of main lines running underground, beneath streets, and lateral lines extending from the mains to the buildings being served. Thus, in any given city or suburban location, many miles of sewer lines exist underground as an essential part of the wastewater treatment system. Generally, the mains are maintained by the municipality or private system owner, while the laterals are the responsibility of the property owner.

The pipes used for the various underground lines are typically of several different materials, such as concrete, ductile iron, terra cotta, or other well known and often used materials. The pipes have a number of joints, typically of the bell and spigot type, with packing to ensure the fluid tightness of the joint. Over time, however, the material forming the joints will decay or will become brittle and crack, causing leaking joints. The shifting and settling of the ground around the pipes also is a major cause of damage to the joints, and additionally, in the case of lateral lines, nearby excavations or tree roots commonly cause shifting of the lines, breaking the pipes and/or the joints. Further, tree roots can penetrate the lines, and faulty installation of new lines is also a significant cause of leakage.

Such damage to sewer lines is a serious problem in a great many areas throughout the country, for several reasons. Firstly, the presence of leaks in the sewer lines, while not generally allowing sewage to flow out into the ground, does allow a large quantity of groundwater to enter the lines. In older areas, particularly ones with aging sewer lines, a large volume of water enters the sewage treatment system, and the volume of water treated is increased, thus increasing the overall cost of the treatment plant. This problem is often referred to as "infiltration and inflow" or simply "I & I". In more modern waste treatment systems using secondary and even tertiary treatment systems, considerable cost is incurred in treating groundwater, which otherwise would not need to be treated, particularly by secondary or tertiary methods. The result is ever increasing costs for such treatment.

Secondly, the cost of repairing such lines is itself a sizeable factor in the operating budget for such systems. To repair a sewer line located beneath a street, the precise location of the leak must be determined. Typically, this would require a large excavation, necessitating closing of the street in whole or in part, to simply locate the leak. Then, either a large section of the pipe must be removed and replaced, or perhaps a patch can be applied directly to the leaking area of the pipe. The equipment and labor costs involved in such repair work are quite high, and the disruption of the ordinary use of the street can be a great problem in many cities.

More recently, efforts have been made to locate the leaks in such lines by using a television camera which is mounted on a dolly, to travel through the line and display an image of a leak site to the operator. The operator can then locate more precisely the leak and source of the inflow, and the repair may be done from inside or outside the pipe. However, when the repairs are done on, or from, the inside of the pipe, they are typically less suitable, and the life of the repair is usually shorter, since the water is tending to flow inwardly, rather that outwardly, and the hydrostatic pressure can become great, disrupting or dislodging an internal patch. While the cost of repairs to a line from the inside is generally lower than the cost of excavating the pipeline, in many cases internal repair is not suitable, such as in the case of very large quantities of inflowing water, i.e. when the line is adjacent to flowing groundwater, which can wash out a repairing compound before it has the time to set or cure.

Other efforts are made to seal the leaks on the outside of the pipe, by applying various sealants or patching materials/products to the pipe joint, or to the area of the pipe surrounding the leak. However, in such operations, care must be taken to avoid the use of materials which would contaminate soil and groundwater, causing still further problems. In the past, quite often bituminous products have been applied to the outside of the pipe to seal leaks. Such products, however, usually will introduce groundwater contaminants into subterranean strata, and such contaminants can travel great distances in the aquifers. The deleterious effects of the use of such materials may not be felt for some years later.

Further, any external technique which requires a large excavation will of necessity cause a disruption in ordinary surface activity, and if the pipe is beneath a main roadway, such disruptions can be a major problem. Also, the existence of other utility lines, such as electric or water lines proximate the sewer lines, can cause further problems with excavation techniques using conventional excavation equipment. Thus, caution must be exercised when doing excavation work, so that the operator does not damage other lines while trying to dig to the sewer line.

Additionally, since sewer lines are often quite deep, requiring a deep excavation, considerable shoring is needed to prevent collapse of the excavation. Thus, the excavation size is generally considerably greater in width than the sewer line, often 10 feet or more in width.

Another problem with prior repair techniques is associated with the fact that it is difficult to determine whether the leak has been sealed before the excavation is backfilled and restored to normal condition. The hydrostatic pressure will not again be exerted on the pipe until after the backfilling has been completed. Thus, if the leak is not properly sealed, it will be necessary to redo the work. Also redoing the work will require removal of the materials previously used. If concrete or other hardenable material was used as the sealant, or if patches with clamps were used, the job is made even more difficult.

Similarly, no suitable technique has heretofore been developed in which only a small excavation is needed, and by which a leak may be properly and suitably repaired.

Prior art techniques have been proposed for overcoming some of the many problems pointed out above, but such techniques have met with only limited success. Thus, U.S. Pat. No. 3,084,719 to Wallace et al discloses a technique which utilizes a plurality of holes drilled into the earth along a sewer line. The technique does not locate the leak precisely but instead drills a number of holes along the line to in effect seal the entire line, leak and all. Next, the patentee injects a quantity of a low viscosity road oil into the holes, and applies a pressure to this oil to "crack" or "break" the soil between adjacent holes. Then, a quantity of a second sealant, an asphaltic emulsion, is forced into the holes so as to travel between adjacent holes and through the fractured formation. The emulsion then sets, hopefully sealing the leaks in the pipe.

One of the major drawbacks of this technique relate to the introduction of large quantities of petroleum based products into the soil, the groundwater and the sewage in the lines. Another drawback is the fact that the sealing is less than certain. If the leak is not sealed the hardened asphalt emulsion around the pipe will make further repairs even more difficult. Further, if any of the sealant enters the sewer line, it is quite possible that the sealant will harden in the sewer line, causing blockage therein. Another drawback is the drilling of multiple holes which can be just as disruptive as one large excavation, damages the roadway in several places and increases the possibility of damaging another utility line.

Another solution was proposed in U.S. Pat. No. 2,917,085 to Douse. Here, the patentee also formed a number of small holes through the ground to the vicinity of the leak, and then injected a quantity of cement into the hole. When the cement was hardened, the leak would be stopped. Once again, however, it is difficult to determine whether the leak has stopped. If not, re-excavation would be considerably more difficult because of the hardened cement in the vicinity of the leak.

Still a different technique is disclosed in U. S. Pat. No. 4,094,150 to Clarke, which uses a gel-forming composition in the earthen formations around sewer pipe joints to prevent groundwater infiltration. The composition is a mixture of a monomeric acrylamide, N,N'methylenebisacrylamide, a diatomaceous earth, a water soluble metal salt and a catalyst such as mixture of ammonium persulphate and sodium thiosulfate in aqueous solution. The water, diatomaceous earth and catalyst are mixed separately from the resins, and once mixed, the composition is said to gel in about 20–30 seconds. The composition is used as a grout around bell and spigot joints or other joints. Because of the short time available after mixing, the material must be placed very quickly around the joint. For this reason, its is likely that this composition could only be applied around a fully uncovered pipe, with a worker down in the excavation. Further, the short time after mixing can lead to a variety of handling equipment problems.

Accordingly, a primary object of the present invention is to provide an improved, simplified method for the sealing of leaks and prevention of infiltration into underground utility lines.

Another object of this invention is to provide a method for preventing infiltration which does not require a large excavation.

A further object of the invention is to provide a method for preventing infiltration into sewer pipes which will not cause groundwater and/or soil contamination.

Yet another object of the invention is to provide a method for preventing infiltration of groundwater into sewer pipes which can be quickly and easily verified.

Still another object of this invention is to provide a method for sealing leaks into sewer lines which can be easily repeated in the event that a leak is not completely stopped.

Yet a further object of the invention is to provide a low cost technique for stopping inflow and infiltration into sewer pipes.

A still further object of the invention is to provide a method for preventing infiltration into sewer pipes which uses readily available, low cost materials.

Another object of the invention is to provide a very effective method for preventing infiltration into sewer pipes which uses relatively unskilled labor, in combination with low equipment costs and low material costs.

Still another object of the invention is to provide an improved method for preventing leaks into sewer lines which can tolerate some settling and shifting without damaging the repaired area.

Still a further object of the invention is to provide a method for preventing leaking into sewer pipes with but small and minor disruption to the surface, thereby reducing long term road maintenance costs.

These and other objects and advantages of the present invention will become apparent from the further description of the invention which follows.

DESCRIPTION OF THE INVENTION

According to the present invention, the general area of a leak in a pipeline is first located. Generally, this is accomplished using conventional techniques, with television cameras or the like. The particular way in which the general location is determined is not significant to the invention, nor is the precise location of the leak.

After the general location is determined, a opening into the ground is made to more accurately locate the pipe. Preferably, the opening is relatively small in size, ranging from 6 inch by 6 inch, up to 12 inch by 12 inch. The hole need not be of regular size or shape. Rather than using a boring implement, such as a drill or auger, the invention makes use of a vacuum excavation technique. This technique utilizes a combination of a high velocity fluid nozzle or jet and a vacuum line. The fluid typically is supplied at a volume of about 100 to 250 cubic feet per minute at a pressure of less than 100 psi. The fluid jet dislodges material in the hole, while the vacuum line removes excess fluid and dislodged material. The fluid used may be air or water or other appropriate fluid.

Water, soil, rock and various other materials removed from the hole by the vacuum line are placed into a suitable receptacle, such as a tank. The entire system may be mounted on a truck, and the excavated material may be vacuumed into tank on the truck for collection and removal. Optionally the removed material may be reused.

Using this vacuum excavation technique, only a small diameter hole is made into the ground. This hole can be used as a visual inspection hole. Further, this technique will not damage the sewer line or other utility lines which might be encountered during the excavation, and the work crew is not exposed to dangers of working around excavating equipment or working in excavations.

Should an obstruction be encountered during the vacuum excavation operation, a simple redirecting of the direction of the jet nozzle will enable the operator to go around the object without damaging it.

Once the hole is at the proper depth, again by redirecting the jet nozzle, the excavation may be directed in order to precisely locate the pipe and the leak. Indeed, unlike the prior art methods, the excavation around the pipe can be easily enlarged so as to expose more of the pipe, whereby a visual inspection could reveal a large hole, break or other deterioration which would require removal and replacement of the pipe.

In most cases, the pipe will not need to be replaced, and the present process may be continued in order to stop the infiltration into the pipe.

Once the general location of the leak has been reached by the vacuum excavation step, a water swellable material is introduced into the hole. Preferably this water swellable material is powdered or granular in nature, and is of such a physical characteristic that the swelling is not instantaneous, but occurs over a relatively short period of time. This will allow the material to flow in dry form into the interstices in the ground, and then be carried some distance into the pores of the ground, gradually swelling until it blocks the flow. A preferred type of water swellable material is a naturally occurring argillaceous material which by nature is non-polluting and can be simply poured into the hole in dry, bulk form. The argillaceous material is one, or a mixture of more than one of the class of naturally occurring clays which are well known to expand by hydration upon contact with water. One of the most commonly known of such clays is bentonite. Another common water swellable clay is attapulgite, and still other such clays are known and useable, although they are generally not as readily available.

The clay is generally packaged in bulk, granular or powdered form, for example in bags of 50 to 100 pounds for ease of handling. The clay is a low cost, naturally occurring material mined in various parts of the world. Thus, this material is not considered to be a contaminant to soils or groundwater.

The quantity of the material poured into the hole will vary slightly depending upon the size of the excavation, but generally would be used to a depth of at least about 1 foot above the pipe. The use of excess material is not harmful, and because of the low cost, an excess is not a significant factor. Generally, excess material should be used over the minimum needed to accomplish the purpose.

After placement into the hole, the clay may be tamped in place, and a quantity of gravel is then placed over the clay material. Preferably, the hole is completely backfilled with gravel. When the backfilling of the hole is completed, any small resurfacing of a street may be done by a simple patch.

Within a short period of time, groundwater will again reach the area of the leak, but will first encounter the argillaceous compound. Upon contact, the clay may migrate slightly toward the leak with the water and will begin to swell. With the swelling, the flow into the pipe will gradually diminish, and in a short period of time, the flow will stop. At this time, the leak is repaired.

At this point, it should be pointed out that it is not necessary that the clay material be in contact with the pipe or the leak when it is placed into the hole, since the migration will always be toward the leak and into the pipe, and the swelling of the clay while it fills the interstices in the soil will stop the flow of the water. With excess clay in place, the swelling will ensure a complete blockage of the flow of water into the pipe. Thus, the clay does not necessarily plug up the hole or leak in the pipe, but may also prevent the groundwater from reaching the pipe, accomplishing the same purpose.

In the event that insufficient clay was introduced into the hole, the excavation may be re-opened in the same manner. At this time, however, the vacuum excavation will be through the gravel backfill material, and will be more easily accomplished, and there will be no hardened cement or other material or product (i.e. clamps) surrounding the pipe to impair the process. Instead, the original clay will be removed by the vacuum excavation process, and may then be replaced in greater quantity than before. Through trial and error, at very low cost, the proper amount of clay for a given hole may be readily determined.

In a preferred embodiment, a water soluble, and environmentally suitable dye is incorporated into the water swellable material. The dye may be a simple food coloring type of dye, or may be a fluorescent dye visible under ultraviolet light. With the use of such a dye, the effectiveness of the leak stoppage may be readily determined by inspection through a downstream manhole. As the inflow of groundwater into the pipe diminishes, the dye will gradually disappear in the sewer line, until the inflow is completely stopped, at which time no dye will be present in the water flowing through the pipe.

Experience has shown that by using this method, the inflow into a sewer line can be completely stopped in less than 24 hours after the work begins. Further, since such a small hole is used, very slight disruption of traffic flow or other surface uses is encountered. Any repair of a street surface is minimal, and can be accomplished simply with a small patch, rather than a repaving operation. Further, the materials introduced to accomplish the goal do not contaminate the soil or the groundwater.

The invention has the additional advantage that the process performed externally of the sewer pipe, can also function without additional work, to stop exfiltration, or outflow, from the sewer pipe. Generally, exfiltration is not a problem, since the hydrostatic pressure surrounding the sewer pipe is ordinarily greater than the pressure within the pipe. However, it is possible that the pressure within the pipe will increase, particularly if the water is blocked from reaching the pipe externally. When this happens, the water in the pipe can flow outwardly through the leak in the pipe. However, when it does so, it will contact the water swellable material external to the pipe, and will be blocked by essentially the same mechanism. Thus, any exfiltration is effectively blocked by the process as well.

DESCRIPTION OF THE DRAWINGS

The invention will be described further in reference to the accompanying, drawings showing non-limiting examples of the invention, and in which.

DESCRIPTION OF PREFERRED EMBODIMENTS

Figure 3:
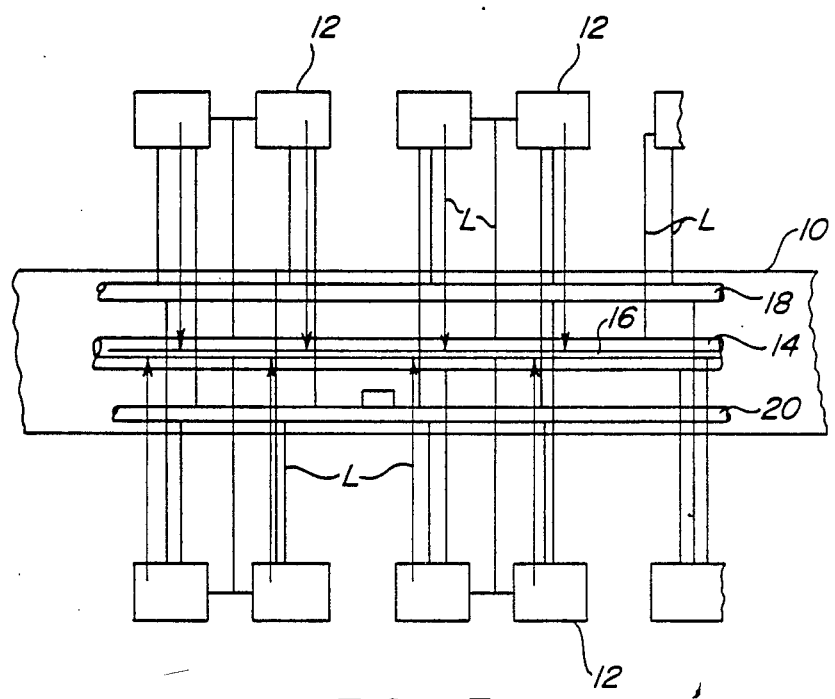
FIG. 3 is a schematic plan view of a typical layout of buildings on opposite sides of a street with utility lines buried therebelow.

Referring firstly to FIG. 3, a typical street layout is shown in which a street 10 has buildings or houses 12 on both sides of the street. Buried beneath the street are utility lines such as a sewer main 14, a water main 16, a gas line 18 and an electric line 20. The relative positions of these lines are merely exemplary of the way in which such lines are often placed in a street. Other obstacles such as large rocks or the like are indicated at 22. The various lateral lines which connect the houses 12 with the main utility lines are designated as L.

Of course it will be noted that the water line 16 is above the sewer line 14, and thus would present an obstacle which must be avoided by any digging.

Figure 1:
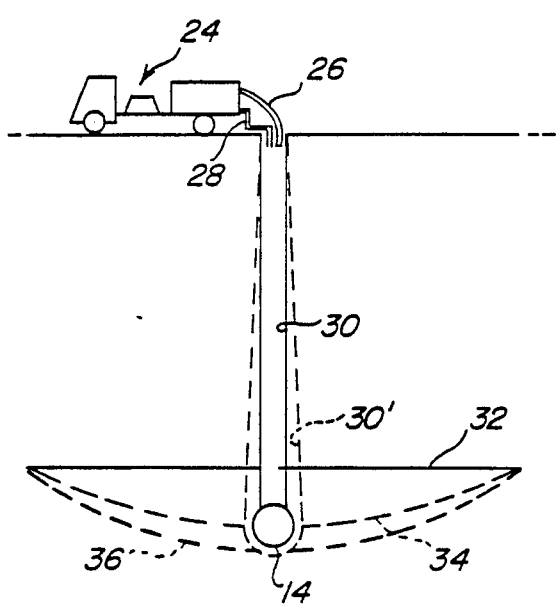
FIG. 1 is a schematic cross-sectional view of an excavation in the vicinity of a sewer pipe.
Figure 2:
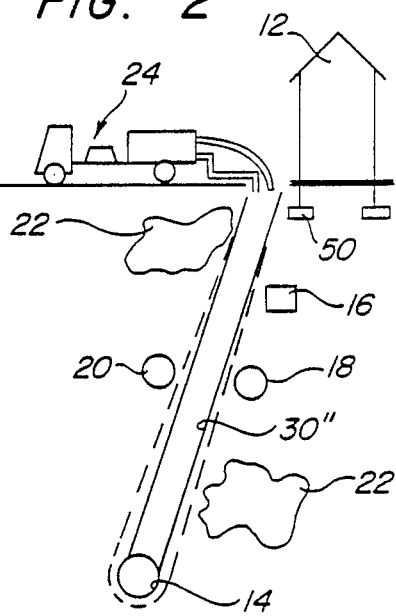
FIG. 2 is a view similar to FIG. 1 showing another excavation near various obstructions such as a building and existing underground utilities.

FIGS. 1 and 2 illustrate the manner in which a hole may be vacuum excavated, either directly vertically or at an angle. A truck 24 is shown which would include the vacuum excavation equipment which would include a pressure line 26 and a vacuum line 28 appropriately connected to the pumps, filter equipment, and spoil receiving receptacles on the truck. The excavation is commenced using the pressure line 26 which is gradually lowered into the hole 30 as the excavation proceeds.

The excavation continues until the sewer main 14 is located. At this point, it may be desirable to enlarge the lower portion of the hole 30 to the dotted line position 30', even around the pipe, to increase access to the sewer main 14. Depending upon the depth of the normal water table, the excavation process can affect the level of the water table. The normal water table level is illustrated at 32 in FIG. 1. It will be appreciated that while a leak allows inflow to the sewer line 14, the water table will lower to the point indicated by the line 34. During repair of the pipe, the water table level will drop even further to the level indicated by the line 36.

After the hole has been excavated to reveal the sewer main 14, workers simply pour into the hole 30 (30') the water swellable material described above. Preferably, this material is introduced into the hole to a depth of 1-2 feet above the sewer main 14. In some cases, it is desirable to lower a pneumatic tamper into the hole 30 (30') to compact the clay in the lower portion of the hole around the main 14. Next, gravel is poured into the hole on top of the clay to a depth of at least several feet above the clay level, and then the hole can be backfilled with fill material. Preferably, the backfilling is completely gravel. Finally, the street surface may be patched with a small patch in a conventional manner.

Within a short period of time, the water swellable material or clay will be moistened by the water in the ground, causing the material to swell, and then forming a nonpermeable "plug" around the pipe in the space surrounding the leak, thus preventing the water from reaching the pipe. It should be noted that the leak may still exist in the pipe, but the water cannot reach the leaking portion of the pipe. It is also possible that some of the clay will flow into the leak in the pipe and in essence plug up that leak. In either case, the inflow stops.

In the preferred embodiment using a clay material with an appropriate water soluble dye blended with the clay, inspection of the water flowing through the sewer pipe to a downstream manhole will reveal whether the leak is stopped. Initially, and shortly after the clay has been placed around the pipe, the downstream inspection will reveal the dye in the flowing water, but after a short period of time, the quantity of dye will decrease and ultimately there will be no dye flowing, providing a visual indication that the inflow of water through the leak has been stopped.

In FIG. 2, the ability of the process to proceed around obstacles is illustrated. An excavation may be made starting in close proximity to a building 12, and may go downwardly at any appropriate angle. As seen, the hole 30" can avoid building foundations 50, rocks 22, underground utility lines 16, 18 and 20, tree roots and the like in reaching the sewer pipe 14. Also, it will be appreciated that the angle of the excavated hole 30" could reach beneath the building to some extent with equal ease.

Clearly, the present process enables repair of sewer lines without the need for having people in an excavation, as is the case in many prior techniques. Aside from the inherent danger of such manual repairs, the cost is quite high since various regulations require substantial shoring of excavations when workers are to be in the excavation.

The size of the opening in the street is essentially determined by the size needed to accommodate the pressure and vacuum lines, typically less than 3 square feet, a size which may be readily patched without large paving equipment, in order to keep the repair cost at a minimum.

The process may also be used to repair other utility lines which are subject to water seepage and damage. For example, jacketed telephone lines or electric lines, and particularly those lines which are in conduits, can be damaged by the presence of water in the jackets or conduits, and the present process will be equally effective in preventing the inflow of water into such lines.

While this invention has been described as having certain preferred features and embodiments, it will be understood by the skilled artisan that the invention is capable of still further variation and modification without departing from the spirit of the invention, and this application is intended to cover any and all variations, modifications and adaptations of the invention that fall within the spirit of the invention and the scope of the appended claims.

I claim:

1. A process for stopping the infiltration of groundwater into a utility line comprising determining the location of a point of leakage into the utility line, forming a small size bore into the ground to the vicinity of the point of leakage into the utility line by vacuum excavation, depositing a quantity of a dry water swellable material into the bore to a depth of at least about one foot above the utility line, and backfilling the excavation.

2. A process as in claim 1 and wherein said water swellable material is an argillaceous material.

3. A process as in claim 2 and including the step of enlarging the excavation in the immediate vicinity of the utility line so that the excavation surrounds the line.

4. A process as in claim 2 and including the step of tamping the argillaceous material in the excavation prior to the backfilling step.

5. A process as in claim 4 and including the step of depositing a layer of gravel over the argillaceous material prior to the backfilling step.

6. A process as in claim 2 and wherein said argillaceous material is selected from the group consisting of bentonite and attapulgite.

7. A process as in claim 1 and including providing said bore with an opening of less than about 3 square feet.

8. A process as in claim 1 and including performing said vacuum excavation by using in cooperation a high velocity fluid jet for excavating soil material and a vacuum hose for removal of excavated material.

9. A process for preventing the infiltration of groundwater into a leaking sewer line comprising determining the location of the leakage into the sewer line, vacuum excavating a bore into the ground using a high velocity jet of air to the sewer line in the vicinity of the leak, depositing a quantity of a water swellable argillaceous material selected from the group consisting of bentonite and attapulgite into the bore to a depth of at least about one foot above the sewer line, tamping the argillaceous material in said bore, depositing a quantity of gravel over the argillaceous material in said bore, and backfilling said bore.

10. A process for stopping the infiltration of groundwater into a sewer line comprising determining the location of a point of leakage into the sewer line, forming a small size bore into the ground to the vicinity of the point of leakage into the utility line by vacuum excavation, depositing into the bore to a depth of at least about one foot above the utility line, a quantity of material consisting essentially of a dry, water swellable argillaceous material including a water soluble dye blended therewith, and backfilling said bore.

11. A process as in claim 10 and including the step of depositing a quantity of gravel over the argillaceous material in said bore prior to said backfilling step.

12. A process as in claim 10 and including performing a downstream inspection of the interior of said sewer line after said depositing step, and determining the presence or absence of said dye in said sewer line as an indication of whether water infiltration into said sewer line has stopped.

13. A process as in claim 10 and wherein said argillaceous material is selected from the group consisting of bentonite and attapulgite.

* * * * *